UNITED STATES PATENT OFFICE.

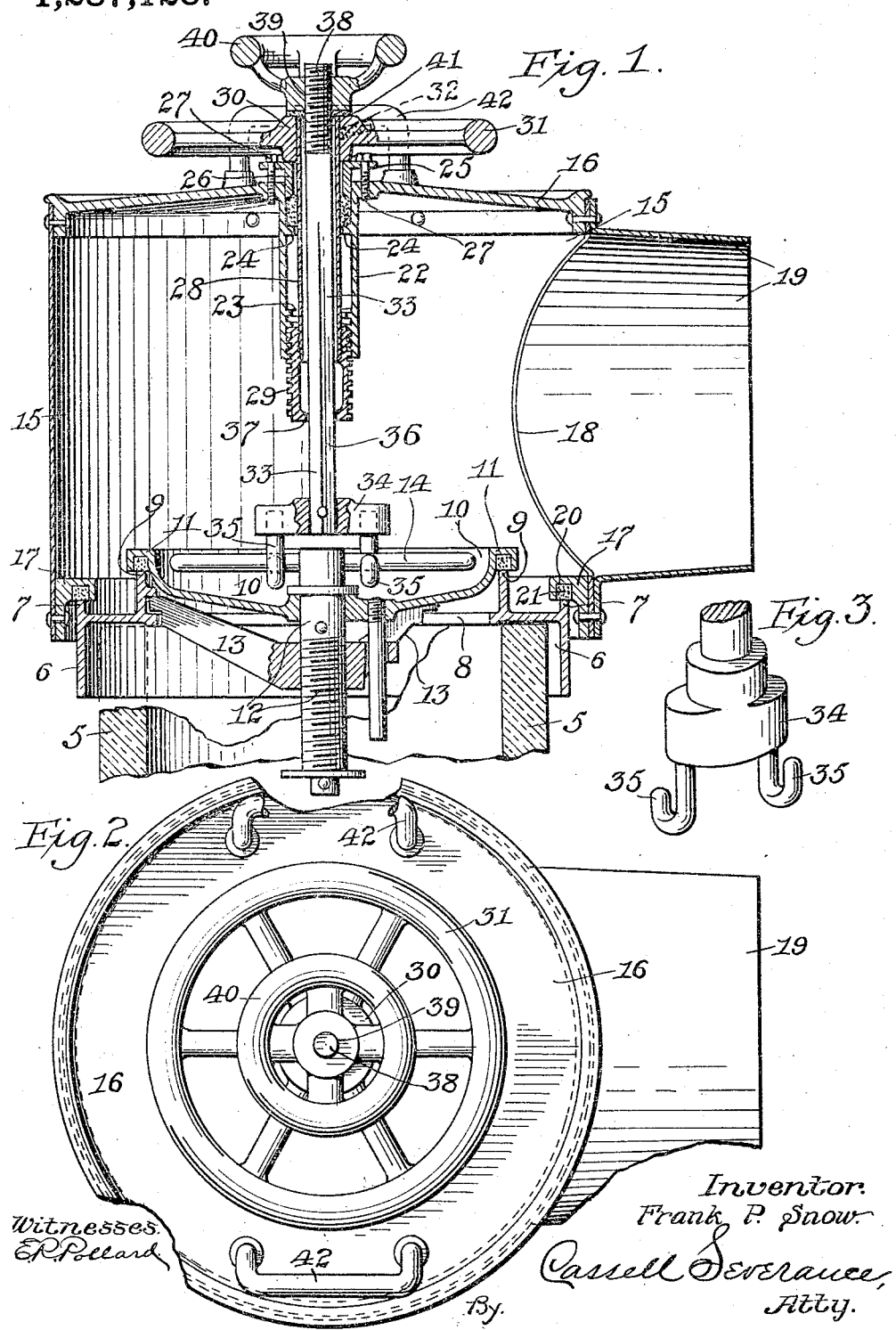

FRANK P. SNOW, OF LOS ANGELES, CALIFORNIA.

PORTABLE HYDRANT.

1,287,128.   Specification of Letters Patent.   Patented Dec. 10, 1918.

Application filed October 18, 1916. Serial No. 126,287.

*To all whom it may concern:*

Be it known that I, FRANK P. SNOW, a citizen of the United States, residing at Los Angeles, in the county of Los Angeles and State of California, have invented certain new and useful Improvements in Portable Hydrants, of which the following is a specification.

This invention relates to improvements in what in the art of irrigation is known as a portable hydrant, and it is the object of the invention to provide a water controlling hydrant mechanism which can be placed over a valve mechanism and made to open the valve mechanism and yet direct the water released by the opening of the valve, in any desired direction.

It is also an object of the invention to provide a portable hydrant for the stand pipe of an irrigating system, the end of which is controlled by a valve device, the hydrant having a casing adapted to be fastened to the valve device, or upon a seat upon the said stand pipe, the casing having a lateral outlet to which is fitted piping or a hose of any kind, to direct water upon any portion of a piece of land which it is desired to irrigate, the device being also adapted to close the valve again for shutting off the water, after which the portable hydrant may be moved to another stand pipe or like position.

It is a further object of the invention to provide a portable hydrant with a valve engaging rod having a squared portion thereon, adapted to be movably engaged by a screw threaded member, the turning of which will raise or lower the valve, for seating or unseating it, screw means being also provided upon said rod for holding the casing of the hydrant tightly in place upon an outlet for water.

It is a still further object of the invention to provide a valve operating and water controlling and directing mechanism having a valve engaging rod member, a screw threaded member movably mounted thereon for actuating the said rod and the valve controlled thereby, the said rod member having screw threads formed upon the same and means for engaging the same for clamping the said water controlling and water directing device to the member from which water issues, a packing means being arranged to make a water tight joint about said rod member and its mechanism.

With these and other objects in view, the invention comprises certain novel constructions, combinations and arrangements of parts as will be hereinafter more fully described and claimed.

In the accompanying drawing forming a part of this specification :—

Figure 1 is a vertical central sectional view through a hydrant mechanism and a valve controlled thereby, said hydrant mechanism being made in accordance with this invention, and parts of the mechanism being shown in side elevation.

Fig. 2 is a top plan view of the said hydrant device, portions thereof being broken away, to secure room for the illustration.

Fig. 3 is a detail perspective view of a valve gripping device mounted within the said portable hydrant.

The device of the present invention is adapted for controlling water outlets and for directing the water released therefrom, upon different portions of a field or a plot of land. It is particularly applicable to water delivering stand pipes, such as are commonly employed in irrigation systems, and particularly irrigation pipe systems. In many systems of irrigation, stand pipes are provided at proper locations and intervals upon plots of land which are to be irrigated, and said stand pipes are usually provided with valves adapted to be fastened over their upper open ends, for controlling the passage of water from the stand pipes and stopping such flow when necessary. Without a hydrant device of the character described, it is very inconvenient to open the valve upon the stand pipes, for the water will flow upon the operator, frequently wetting him thoroughly, and with such quantities of water as are released in the vicinity of the stand pipe, wet and boggy ground is produced in the neighborhood of the stand pipe, making it frequently difficult to reach the stand pipe without getting upon muddy land. With a hydrant of the character described, the casing of the device can be clamped in position over the outlet end of the stand pipe, and the valve controlling the outlet of the stand pipe may be then unseated for delivering the water into the casing of the hydrant, from whence it is diverted through piping or hose applied to the outlet of the hydrant casing for directing the water upon the different parts of the ground to be irrigated and without loss of water and the making of muddy conditions around the stand pipe, and without drenching the operator. In the accompanying drawing the preferred form of hydrant has been illustrated and the details and features of the invention will now be more specifically described and fully claimed. In the said drawing, 5 indicates the upper end of a stand pipe, of an irrigating system, a band or ring member 6 being applied to the upper end thereof and formed with a seat 7, usually in the form of an upwardly projecting circular flange, upon which a hydrant may be set and fastened. As in the illustration, the said ring member 6 is preferably formed with a central opening 8 surrounded by a valve seat 9. A valve 10 is adapted to close the opening 8 and by means of the peripheral portion 11 with the packing which is carried thereby, is thus adapted to make a tight joint, engaging the upper circular edge of the said seat 9. The valve shown in the illustration is usually provided with a central screw or standard 12 having a threaded portion engaging a threaded opening in a removable spider 13. The upper end of said standard or screw 12 is provided with a transversly arranged handle, usually in the form of a steel pin 14, cast in the upper end of said screw or standard. The spider 13 is removably mounted in the ring member 6 and may be removed or fastened again in place within the opening 8 in any desired manner. The structure of the valve itself, forms no part of this invention, and is preferably formed like a valve invented by me and shown and described in a companion application, filed by me on the 18th day of October, 1916, and bearing Serial Number 126,286. It will be understood that in a valve of this kind, it is only necessary to turn the screw member or standard, in one direction to unseat and open the valve and in the other direction to seat it again and close the same. The hydrant forming the subject matter of this invention is adapted for this purpose without the escape of water, except through the piping which is to direct the water over the ground to be irrigated.

The hydrant proper is formed with a casing 15, usually of sheet metal with a head 16, usually of cast metal, riveted, or otherwise secured in the upper end of the casing 15, and with a seat member or ring 17 riveted or otherwise secured in the lower end of said casing. The casing is provided with a large opening 18 upon one side and a discharge nozzle or outlet 19 is fitted in said opening and is usually provided with tapering walls to receive the end of a surface pipe, hose connection, or the like. It is usually sufficient to push the end of the pipe upon the tapering walls of the said outlet nozzle 19 in order to make a tight joint between the parts. The ring member 17 is usually formed with an inwardly extending overhanging portion, having a groove 20 upon its under surface or edge, to receive a suitable packing as 21. The packing is so positioned as to engage the upper edge of the seat 7 upon the ring member 6, and thereby form a water tight joint with the same, when the casing of the hydrant is put in position thereon.

The mechanism for securing the hydrant in position on the stand pipe, and for turning the valve in opening or closing the same, is mounted upon the head 16 of the device. The said head is formed with a central opening around which extends a depending tubular member 22. The lower end of the tubular member has interior screw threads 23 extending from the bottom thereof, upwardly therefrom within the tube a short distance. The upper end of the tubular member is formed with an inwardly projecting annular shoulder 24 adapted to form part of a packing gland. The upper part of the gland is formed by a gland member 25 having an annular portion 26 adapted to be drawn downwardly upon packing of any desired kind which may be arranged within the upper end of said tubular member. Gland screws 27 adjustably hold the upper packing member 25 in position. An elongated sleeve 28 passes through the said gland, the packing in the gland engaging the same and making a water tight joint therewith, the lower end of said sleeve being rigidly secured to a hollow screw member 29. The said hollow screw member is formed with threads upon the exterior surface thereof adapted to engage the interior threads 23 on the tubular member 22. The upper end of the sleeve 28 extends above the packing gland a sufficient distance to extend into the hub 30 of a hand wheel 31. The hub is usually rigidly fastened to the said sleeve as by a set screw indicated in dotted lines at 32. By turning the wheel 31, the hollow screw member 29 will be caused to raise or fall within the said tubular member 22.

Within the sleeve 28 is a valve operating rod 33, the lower end of said rod having a cross head 34 rigidly fastened thereto, provided with depending oppositely facing hooks 35, which are adapted to receive the handle or pin 14 of the valve mechanism. The rod 33 is preferably made square for the greater portion of its length as at 36 and engages a square opening 37, formed in the lower end of the screw member 29. Thus the screw member 29 thereof is sufficiently loose on the valve operating rod to slide up and down with respect to the same and will turn the said screw rod as it is operated in the lower end of the tubular member 22. The upper end of the said valve operating rod is provided with a cylindrical screw threaded portion 38 which is adapted to be engaged by the central screw threaded aperture 39 of a small hand wheel 40. With the hand wheel 40 turned sufficiently to loosen the rod 33 the oppositely facing hooks 35 may be caught upon the handle 14 of the valve mechanism. By tightening the wheel 40 upon the end of the rod 33, the said rod may be drawn upwardly until the hooks 35 cannot become disengaged from the said handle 14. The hand wheel 40 seats against the upper end of the hub 30 of the larger hand wheel 31. By interposing a rubber or other tight joint forming washer or gasket 41 between the hubs of the two hand wheels, a water tight joint can be had at the upper end of the said sleeve 28 as will be readily understood by reference to Fig. 1 of the drawing. It will be evident that the valve operating rod 33 may be made of any many sided formation as desired, aside from a cylindrical form, whereby the turning of the screw member 29 will be effective for turning the said valve operating rod 33. The pitch of the valve screw 12 and of the threads on the screw member 29 are substantially the same, so that after the hooks have been fastened upon the valve handle 14, the turning of the larger hand wheel 31 will cause the rod 33 to raise the valve 10 at substantially the same rate of speed as the screw member moves, whereby the said valve operating rod 33 and the screw rod 12 of the valve, will move simultaneously to the desired height for opening the valve, or closing the same.

In the operating of the device, when it is desired to take water from a stand pipe and deliver it to any part of the field, the hydrant is placed upon the upper end of the stand pipe, its ring 17, being put in position on the seat flange 7. The valve 10 will of course be closed and fitted tightly enough to prevent the escape of water. The hand wheel 40 is then turned so as to lower the cross head 34 and permit the hooks 35 to be caught again upon the handle pin 14 of the valve. The hand wheel 40 is then turned in a direction to draw the valve operating rod 33 upwardly and hold the hooks 35 tightly against the handle 41. The same movement will make a tight joint between the washer 41 and the hub 30 of the hand wheel 31 and also between the packing of the ring 17 and the ring 7. The parts are now in position for the opening of the valve 10 within the hydrant casing, from a position outside the same, through the agency of the wheel 31. In turning the said wheel, the sleeve 28 carried thereby, rotates the hollow screw member 29 and causes it to move upwardly in the tubular member 22. The said screw member will turn the valve operating rod 33 and the pitches of the screw threads being the same on said member and on the valve rod or stem 12, will cause them to move upwardly in unison to the same degree. The parts held together by the hand wheel 40 will thus not be disturbed, since the sleeve 28 will carry the hand wheel 31 upwardly at the same rate that the valve is being opened. Any suitable field or surface piping is slipped upon the outlet nozzle 19, and the water is thus directed to any portion of a field or a piece of land as may be desired. The said piping can be moved to different parts of the field from time to time. When it is desired to use the hydrant upon a stand pipe in another part of the field, or upon another piece of land, the valve 10 is first seated by turning the hand wheel 31, after which the hand wheel 40 is loosened and the hooks disengaged from the handle 14. The casing of the hydrant may be lifted from the seat flange 7, and the devices can be mounted upon any other stand pipe. Handles 42 are preferably secured upon the top of the casing 15 to facilitate the carrying of the hydrant and the placing of the same in position or removing the same therefrom.

It will be observed that the adjustment of the hand wheel 40 not only preserves the desired relation between the operating rod 33 and the valve stem 12, but positively holds the casing of the hydrant against the seat flange 7 to the extent of preventing any leakage at the said flange.

It will be understood that the hydrant may be applied to other kinds of stand pipe controlling valves if desired, provided a screw stem having a proper pitch is used, in operating the valve. It will also be understood that the flange which engages the seat 7 may be altered in shape if desired to fit upon other kinds of stand pipe rings or to engage the material of the stand pipe itself if preferred. It will be further observed that the use of a smooth sleeve 28 in passing through the top of a casing, permits of a packing of the same, without interfering with its operation, and thus making a water tight joint in the top of the hydrant.

It will be further understood that different kinds of gripping means may be used for securing the valve operating rod 33 to the valve rod or stem or the water controlling valve, without departing in the least from the spirit of the invention.

What is claimed is:—

1. A portable irrigation hydrant comprising a casing supported on a stand pipe having a valve seated therein, and valve operating means held thereon including a primary valve operating device and a gripping device supported in said primary device and extended therefrom and capable of adjustment relative thereto for connection with and disconnection from said valve, said casing having a head with a depending hollow stem, and screw means therein for adjusting the valve operating and gripping means.

2. In a portable hydrant including a casing supported on a stand pipe having a valve seated therein, a valve operating member supported on and extended outside of said casing, and means operable with and by said operating member and longitudinally adjustable relative thereto for gripping said valve, said casing having a head with a depending hollow stem, and screw means therein for adjusting the valve operating and gripping means.

3. The combination with a water delivering pipe and a valve controlling the discharge of the water, a portable hydrant having a casing adapted to inclose the valve and having a seat engaging the valve ring, a reciprocating sleeve having a screw threaded engagement with the casing structure, a valve operating rod, adapted to be connected with the valve and adjustable relative to said sleeve, said reciprocating sleeve being adapted to turn said operating rod, and means for operably connecting said rod to said valve.

4. A portable hydrant mechanism comprising a casing having an opening in the bottom adapted to receive the discharge end of a water delivering pipe, a reciprocating member mounted in the casing, a valve operating rod adjustable therein and having a gripping device adapted to engage a valve, and means for tightening the said extension rod upon the valve, whereby the valve may be operated, and whereby the casing may be anchored in position with respect to the water discharge member.

5. In combination with a stand pipe and a valve, of a casing adapted to inclose the said valve, a tubular extension in said casing having internal threads, a reciprocating member movable in said tubular extension and carrying a screw threaded member, a packing gland surrounding said reciprocating member and adapted to form a water tight joint therewith, a hand wheel for turning said reciprocating member, a valve operating rod adjustable relative to said reciprocating member and rotatable therewith when said valve is turned, and a screw threaded member engaging the said valve operating rod, and holding the parts together.

6. An irrigating hydrant comprising in combination with an irrigation stand pipe, and a water controlling valve mounted in the end thereof, of a casing having a valve receiving opening and a water discharge outlet, a top portion having a downwardly extending tubular member formed with an annular packing space therein and having internal threads, a sleeve member passing through said packing space, a hollow screw threaded member secured to said sleeve member and engaging the internal threads of the tubular member, and an adjustable gland member adapted to hold packing in said packing space for making a tight joint with said sleeve, a valve engaging operating rod, gripping means for connecting the same with the valve to be operated and a screw member engaging the said rod for gripping the parts tightly together when the valve is opened or closed.

7. A portable irrigating hydrant comprising a casing having an inlet and outlet, and supported on a stand pipe having a valve seated therein, a stationary internally threaded sleeve depending into said casing, a primary operating member threaded through said sleeve, a secondary operating member extending through said primary member and attachable to said valve, said secondary member being operable with said primary member for operating said valve and independently thereof for connection with said valve.

In testimony whereof, I have hereunto set my hand, in presence of two witnesses.

FRANK P. SNOW.

Witnesses:
CASSELL SEVERANCE,
EARLE R. POLLARD.

Copies of this patent may be obtained for five cents each, by addressing the "Commissioner of Patents, Washington, D. C."